(12) United States Patent
Zhao et al.

(10) Patent No.: US 6,718,082 B2
(45) Date of Patent: Apr. 6, 2004

(54) SOLID-STATE OPTICAL WAVELENGTH SWITCHES

(75) Inventors: Jing Zhao, Winchester, MA (US); Xianfeng Lin, Woburn, MA (US)

(73) Assignee: Agiltron, Inc., Wilmington, MA (US)

( * ) Notice: Subject to any disclaimer, the term of this patent is extended or adjusted under 35 U.S.C. 154(b) by 35 days.

(21) Appl. No.: 10/017,236

(22) Filed: Dec. 18, 2001

(65) Prior Publication Data

US 2003/0113055 A1 Jun. 19, 2003

(51) Int. Cl.[7] .............................. G02B 6/26; G02B 6/42
(52) U.S. Cl. .............................. 385/16; 385/11; 385/15; 385/22; 385/36; 385/47; 398/45; 398/65; 398/86; 398/152; 359/494; 359/495; 359/496
(58) Field of Search .............................. 385/11, 15, 16, 385/18, 22, 24, 31, 36, 39, 47; 398/43, 45, 48, 65, 86, 152; 359/494–496

(56) References Cited

U.S. PATENT DOCUMENTS

| | | | | |
|---|---|---|---|---|
| 5,694,233 A | * | 12/1997 | Wu et al. | 398/49 |
| 5,724,165 A | | 3/1998 | Wu | 359/117 |
| 5,867,291 A | | 2/1999 | Wu et al. | 359/124 |
| 5,912,748 A | | 6/1999 | Wu et al. | 359/117 |
| 5,930,039 A | * | 7/1999 | Li et al. | 359/484 |
| 5,982,539 A | * | 11/1999 | Shirasaki | 359/484 |
| 6,088,491 A | * | 7/2000 | Sorin et al. | 385/11 |
| 6,097,518 A | | 8/2000 | Wu et al. | 359/128 |
| 6,134,358 A | | 10/2000 | Wu et al. | 385/16 |
| 6,137,606 A | | 10/2000 | Wu et al. | 359/124 |
| 6,166,838 A | | 12/2000 | Liu et al. | 359/128 |
| 6,192,174 B1 | | 2/2001 | Lee | 385/24 |
| 6,212,313 B1 | | 4/2001 | Li | 385/24 |
| 6,275,312 B1 | | 8/2001 | Derks | 359/117 |
| 6,366,402 B1 | * | 4/2002 | Li | 359/484 |
| 6,370,287 B1 | * | 4/2002 | Liu | 385/11 |
| 6,400,508 B1 | * | 6/2002 | Liu | 359/495 |
| 6,441,960 B1 | * | 8/2002 | Wang et al. | 359/497 |
| 6,441,961 B1 | * | 8/2002 | Hou et al. | 359/497 |
| 6,493,139 B1 | * | 12/2002 | Liu et al. | 359/484 |
| 6,577,430 B1 | * | 6/2003 | Jin et al. | 359/280 |
| 6,631,238 B2 | * | 10/2003 | Liu et al. | 385/140 |
| 6,636,651 B2 | * | 10/2003 | Li | 385/11 |
| 2002/0027711 A1 | * | 3/2002 | Tai et al. | 359/497 |
| 2002/0126945 A1 | * | 9/2002 | Konishi et al. | 385/15 |
| 2002/0186914 A1 | * | 12/2002 | Li | 385/11 |
| 2003/0002155 A1 | * | 1/2003 | Xue et al. | 359/495 |
| 2003/0068112 A1 | * | 4/2003 | Jin et al. | 385/11 |
| 2003/0090796 A1 | * | 5/2003 | Tai et al. | 359/484 |

* cited by examiner

Primary Examiner—Brian Healy
Assistant Examiner—Daniel Petkovsek
(74) Attorney, Agent, or Firm—Michael G. Crilly, Esq.

(57) ABSTRACT

The present invention provides an improved optical wavelength switch in which no mechanical movement is required to direct optical pathways between several fiber ports. The inventive three-fiber port device divides incoming optical signals into two subsets of spectra and selectively directs them into two output ports in response to an electrical control signal. In the inventive switch, an optical signal is spatially split into two polarized beams, by a birefringent element, which thereafter pass through a series polarization rotation elements and recombine into output fibers, achieving polarization independent operation. Advantageously, the inventive switch incorporates two-stage polarization rotations to improve isolation depth, as well as temperature and wavelength independence. The invention also incorporates light bending devices to allow two fibers to be coupled to the light beams via a single lens, thereby achieving small beam separation for compactness. Switches rely on electromagnetically or electro-optically switching the beam polarizations from one state to another to rapidly direct the light path.

22 Claims, 8 Drawing Sheets

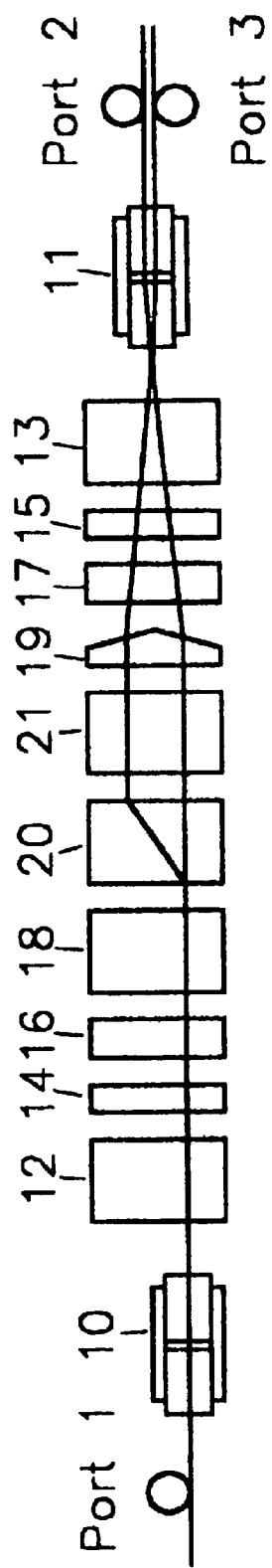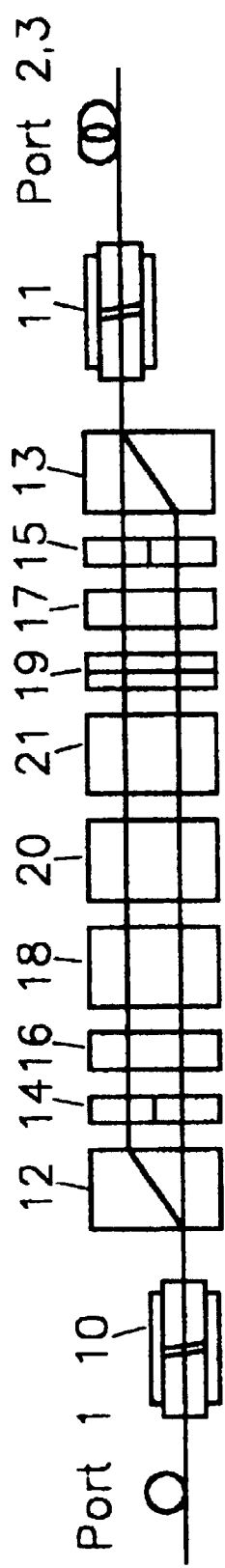
FIG. 3A
FIG. 3B

SOLID-STATE OPTICAL WAVELENGTH SWITCHES

BACKGROUND OF THE INVENTION

1. Field of the Invention

The present invention relates to an optical device. More particularly, the invention relates to a non-mechanical optical wavelength selective switch.

2. Description of Related Art

Fiberoptic wavelength division multiplexing (WDM) has emerged as the dominant platform for telecommunications, providing a major leap in capacity by enabling a single fiberoptic cable to transmit multiple waves of light at once thereby multiply increasing communication bandwidth. WDM systems transmit information by employing optical signals including a number of different wavelengths, known as carrier signals or channels. Each carrier signal is modulated by one or more information signals. For further bandwidth expansion, intelligent optical networks become critical in which optical channels are dynamically routed/switched in the optical layer. Therefore, wavelength selective optical routers/switches are a key component in next-generation optical networks. Such devices are analogous to electrical switches in electrical networks. Optical wavelength selective switches can be used to perform basic WDM functionalities, such as optical signal routing, channel add/drop, and dynamic multiplexing/demultiplexing. However, optical wavelength selective switching has not been widely adopted because of the lack of commercially available components of needed reliability.

In an optical switch, a light signal must accurately enter into an optical fiber or much of the signal strength is lost. The alignment requirements of micro-optic devices are particularly stringent, as fiber core diameters are typically as small as 2 to 10 micrometers and their acceptance angle is fairly narrow. Furthermore, insertion losses reduce the amplitude of the optical signal. Therefore, optical switches that accept light from an input optical fiber and selectively couple that light to any of a number of output optical fibers must transfer that light precisely and within a small acceptance angle for the light to efficiently enter the fiber. Currently, optical wavelength selective switching is achieved by coupling optical filters with mechanical optical switches. Consequently, such devices have many drawbacks including slow switching speed, low reliability, and bulky size. One such mechanical wavelength selective switch is described by Lee in U.S. Pat. No. 6,192,174 issued on Feb. 20, 2001. It is therefore greatly desirable to have integrated optical wavelength selective switches that direct light beams according to their wavelength without moving parts, a feature generally associated with high reliability and high speed.

A non-mechanical optical wavelength selective switch is described and claimed by Wu et al. in U.S. Pat. No. 5,694,233 issued on Dec. 2, 1997. FIG. 1 depicts the optical wavelength switch 999 from Wu et al., herein incorporated by reference. A WDM signal 500 containing two different channels 501, 502 enters the optical wavelength switch 999 at an input port. A first birefringent element 30 spatially separates the WDM signal 500 into horizontal and vertically polarized signals 101 and 102 via a horizontal walk-off element. Signals 101 and 102 are coupled to a two-aperture polarization rotator 40. The polarization rotator 40 selectively rotates the polarization state of either signal 101 or 102 by a predefined amount to render their polarization parallel. The polarization rotator 40 consists of two sub-element rotators that form a complementary state so that when one aperture turns ON the other turns OFF. By way of example, one signal 102 in FIG. 1 is rotated by 90° so that signals 103, 104 exiting the polarization rotator 40 are both horizontally polarized when they enter a wavelength filter 61.

A waveplate wavelength filter 61 selectively rotates the polarization of wavelengths in either the first or second channel to produce filtered signals 105 and 106. For example, the wavelength filter 61 may rotate wavelengths in the first channel 501 by 90° but not wavelengths in the second channel 502. The filtered signals 105 and 106 then enter a second birefringent element 50 that vertically walks off the first channel into beams 107 and 108 and the second channel into beams 109 and 110. A second wavelength filter 62 then selectively rotates the polarization of signals 107 and 108 but not signals 109 and 110 thereby producing signals 111, 112, 113 and 114 having polarizations that are parallel to each other. A second polarization rotator 41 then rotates the polarizations of signals 111 and 113, but not 112 and 114. The resulting signals 115, 116, 117, and 118 then enter a third birefringent element 70. This birefringent element 70 combines signals 115 and 116, into the first channel, which is coupled to one output port and also combines signals 117 and 118 into the second channel, which is coupled into another output port.

As described above, by suitably controlling the polarization rotation induced by the polarization rotators 40 and 41, the optical wavelength switch 999 operates as a wavelength selective device. Furthermore, the optical wavelength switch 999 can also operate as a passive interleaver multiplexer or de-multiplexer via a fixed set of polarization rotators in 40 and 41.

The optical wavelength switch 999 has major drawbacks. First, it is disadvantageously based on a large spatial separation between two fibers located on the same side. The configuration requires individual imaging lens for each fiber port and consequently requires large and long-length crystals to deflect the beams. The use of three separated collimators to couple the signals into and out of optical fibers adds size, complexity, and cost. Moreover, the long couple distance increases signal loss. The bulky size also leads to instability, since operational stability is inversely related to the mass of birefringent materials. As a result, the optical wavelength switch 999 typically has high loss, excessively large size, and is expensive to produce and less stable in operation. Second, the electrically controllable polarization rotators 40 and 41 are based on a two-part aperture design that rotates the optical beams separately in a complementary manner, i.e. when one turns ON the other turns OFF. Such a design is primarily for the incorporation of organic liquid crystal device (LCD) based polarization rotators. The LCD usually employs surface electrodes in the light path to apply an electrical field. Consequently, two individually controllable rotators can be easily fabricated on the same element via electrode patterns. However, the use of liquid crystal materials leads to undesirable properties of slow speed and large temperature dependence, which are objectionable for optical network applications. Recent progress in inorganic magneto-optic and electro-optic materials has opened new opportunities to produce solid-state optical switches of faster speed and high stability. However, the two-part separately controlled polarization rotator 40, 41 in the optical wavelength switch 999 is unsuitable for incorporating inorganic crystals. This is so because it is very difficult and impractical to apply two opposite fields with reasonable uniformity to two adjacent Faraday crystals or electro-optic crystals, due to the strong field interference across the small spatial separation.

An optical interleaver described by Li in U.S. Pat. No. 6,212,313 issued on Apr. 3, 2001 represents some improvement by using dual fiber sharing a single imaging lens to reduce the size of the optical device. However, wavelength selective devices based on Li are primarily designed for passive interleaver applications. Li is not amenable to active wavelength selective switches, because it too is based on the same two-part aperture polarization rotator design described by Wu. For reasons described above, the Li invention is unsuitable for wavelength switching/routing applications using solid-state materials of magneto-optic garnet or electro-optic crystals as the controllable polarization rotators. Moreover, reflection type optical configurations like Li are based on the use of either three separated collimators or a triple collimator on one side to couple the signals into and out of optical fibers. The use of multiple individual collimators significantly increases size and adds cost. Also, a triple collimator substantially increases complexity, resulting in increased interdependency among alignments of elements along each optical path. Therefore, the manufacture of Li type devices is difficult and production costs are high.

Due to the difficulties discussed above, solid-state wavelength switches are not commercially viable. Therefore, there is a need for an improved optical wavelength switch that overcomes the deficiencies inherent to the related art. It would be particularly desirable to provide optical wavelength selective switches combining low optical insertion loss, high-speed switchability, and high reliability. It is also important that these switches are constituted from components of small size, require a reduced number of alignment steps, and have large assembly tolerance to facilitate low-cost manufacture. The inventive optical devices described here provide these critical attributes.

SUMMARY OF THE INVENTION

The present invention provides a compact, robust and economical non-mechanical optical wavelength selective switch that can be efficiently coupled to optical fibers using fewer parts and having larger assembly tolerance than the prior art. The inventive three-port device divides the incoming WDM optical signals into two subsets of channels and switchably directs them into two selected output ports in response to an electrical control signal. The invention allows for the use of inorganic crystal material to achieve fast, reliable and stable wavelength switching and filtering functions. The inventive wavelength selective switch uses at least one single lens to couple two fibers achieving small beam separation thus small size and low material cost. The invention further consists of a light-bending device, situated to compensate for the angle between the two light beams that share the same lens, advantageously increasing alignment tolerance.

The solid-state optical wavelength selective switch of the present invention has several advantages over the related arts. First, the inventive configuration places two fiber ports on the same side to be physically close and adjacent to each other and to share the same imaging element, leading to fewer optical elements comprising the entirety of the switch. The closely spaced beam propagation arrangement reduces the size requirements for each birefringent beam deflection element, consequently lowering material costs. The design also results in a smaller footprint as compared to the prior art. Prior non-mechanical optical wavelength switches have an arrangement wherein each optical port has its own individual imaging element, disadvantageously requiring larger dimensions, and hence greater volume, within each separate component comprising the device. Second, the present invention incorporates a beam angle correction system, allowing adjustment of position and angle substantially independently, reducing position sensitivity and achieving maximum light coupling. This inventive configuration greatly reduces assembly and packaging complexity and, therefore, is particularly desirable for volume production. Third, the present invention is based on electrically controllable polarization rotators having a single-part aperture. This simple configuration is better suited for using magneto-optic Faraday crystals or inorganic electro-optic materials as the controllable polarization rotator. Prior non-mechanical optical wavelength switches have disadvantageous configurations wherein the controllable polarization rotators utilize a two-part aperture of different rotations that is not amenable with using inorganic polarization rotating materials.

In one aspect of the present invention, an optical signal within different channels may be rapidly and reliably switched between two optical paths, according to applied electrical control signals. The inventive optical wavelength switch may be used in telecommunications systems/subsystems for applications such as WDM channel add/drop, dynamic reconfiguration, multiplexers/demultiplexers, and signal routing. The inventive optical wavelength selective switches are particularly suited for WDM optical network applications, where high-speed and reliable switching is required. These and other advantages of the inventive optical switches are elaborated in the specific embodiments described herein.

The wavelength switch described here is a polarization-rotation based device in which a randomly polarized input light beam is split into a pair of beams of two orthogonal polarizations. The optical wavelength is further split into two sets of complementary spectra of different polarizations by passing through waveplate-based filters. The light beams from one spectrum go to one fiber but that with the other spectrum goes into another fiber. The electrically controlled polarization rotators switch the state of polarization of the light beams from one to the other, consequently switching the two sets of wavelengths from one port to another port. The inventive device advantageously achieves routing while conserving all optical energy regardless of the polarization of the input signals.

BRIEF DESCRIPTION OF THE DRAWINGS

FIGS. 3A–3B are top and side cross-section views, respectively, of a nonreciprocal optical wavelength switch as in FIG. 2, illustrating the arrangement of each element within the switch body for this embodiment.

DETAILED DESCRIPTION OF THE INVENTION

Figure 1:
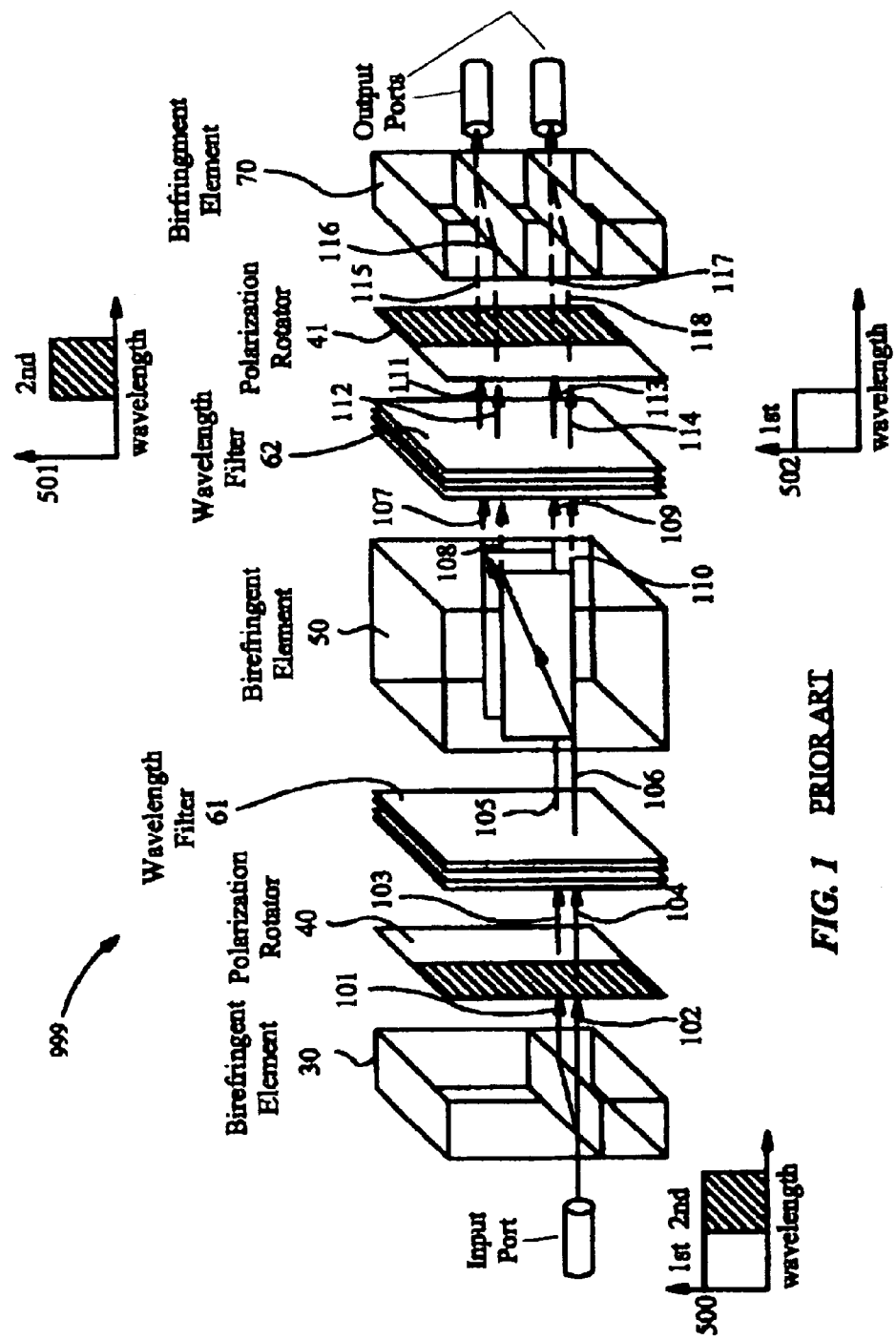
FIG. 1 depicts a perspective view of an optical wavelength switch according to the prior art.

The present invention achieves wavelength selection by passing light through at least one birefringent crystal filter. The principle of its wavelength filtering function can be described by the following. A uniaxial crystal cut parallel to the optic axis introduces a relative phase difference $\Delta\delta$ between the two polarization components of the incident light wave. This phase shift can be expressed as:

$$\Delta\delta(\lambda)=2\pi|n_o(\lambda)-n_e(\lambda)|L/\lambda \qquad (1)$$

Where L is the crystal length, and $n_o(\lambda)$ and $n_e(\lambda)$ are its ordinary and extraordinary refractive indices, respectively.

When $\Delta\delta$ equals $2k\pi$ (k=0,1,2, . . . ), the relative retardation is one wavelength, the two polarization components are in-phase, and there is no observable effect on the polarization of the incident monochromatic beam. However, when $\Delta\delta$ is equal to $(2k+1)\pi$ (k=0,1,2, . . . ), the effect of the crystal in the light path is to rotate the polarized plane of the incident light by an angle between the incident polarization direction and the crystal's principle axis. When the crystal's principle axis is oriented at an angle of 45° with the incident polarization plane, the polarization of the emerging light will rotate 90° relative to its original direction.

Since the phase shift is also a function of wavelength, with a particular crystal length L, the birefringent crystal can introduce a $2k\pi$ (k=0,1,2, . . . ) phase difference to $\lambda_1$ as well as a $(2k+1)\pi$ (k=0,1,2,) phase difference to $\lambda_2$ simultaneously. These L values can be determined by following equations:

$$\begin{cases} \Delta\delta(\lambda_1) = 2\pi|n_o(\lambda_1) - n_e(\lambda_1)|L/\lambda_1 = 2k\pi \; k = 0, 1, 2, \ldots \\ \Delta\delta(\lambda_2) = 2\pi|n_o(\lambda_2) - n_e(\lambda_2)|L/\lambda_2 = (2k+1)\pi \; k = 0, 1, 2, \ldots \end{cases} \qquad (2)$$

Therefore, with a proper thickness and optic axis orientation, a birefringent crystal can selectively rotate the polarization of $\lambda_2$ by 90° and at the same time maintain the polarization of $\lambda_1$, as a light beam containing $\lambda_1$ and $\lambda_2$ transmits through the birefringent crystal filter. The effect of the birefringent waveplate filter on the incident light's entire wavelength spectrum generates two eigen states. The first eigen state carries a first sub-spectrum with the same polarization as the input, and the second eigen state carries a complementary sub-spectrum at the orthogonal polarization. For WDM signals, the eigen state wavelengths are matched to the ITU standard values and the two sets of eigen states interleave each other. The crystals used in the filter are designed to have different lengths and composed of different materials. These crystals are placed in series to achieve various wavelength interleaving spectral characteristics, such as flat top, and also to compensate for temperature and dispersion effects.

The present invention will be further described in terms of several optical wavelength switch embodiments having specific constituent components and specific configurations.

Two Stage Wavelength Selective Switch

Figure 2:
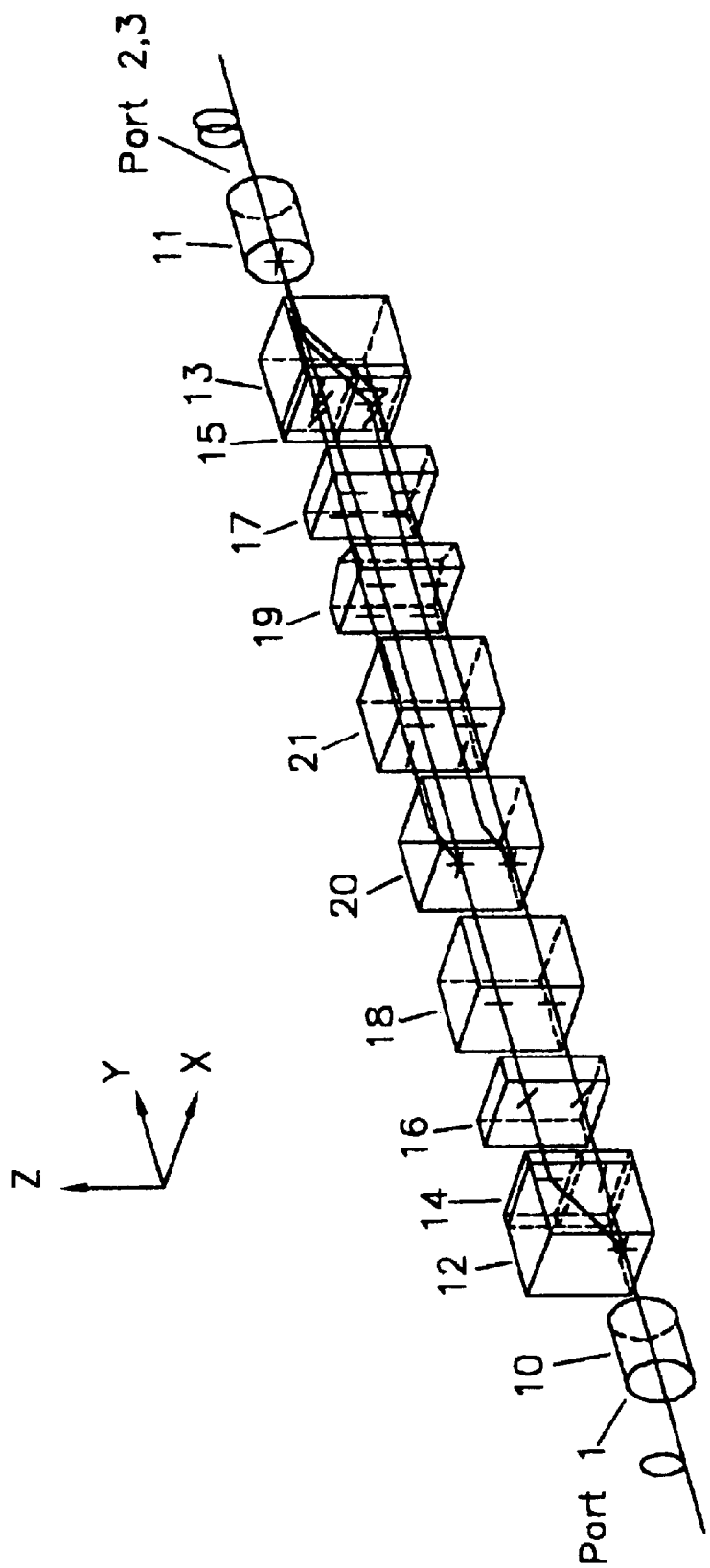
FIG. 2 is a perspective view of a three-port two-stage optical wavelength selective switch according to a first embodiment of the present invention.

FIG. 2 schematically depicts an embodiment of a three-port, two-stage non-mechanical optical wavelength switch.

The invention relates to an optical switch comprising several optical components which are optically coupled along a longitudinal axis including the following: two separate birefringent elements 12, 13 wherein one displaces at least, one optical beam into two polarized component beams and the other combines at least two polarized component beams to form an optical beam; two two-aperture halfwave plates 14, 15, for separately rotating the polarization of the beams such that both beams have the same polarization state or for rotating two parallel polarization beams into orthogonal polarizations; two electrically controllable polarization rotators 16, 17 for separately rotating the polarization orientation of the polarized component beams upon an applied electrical signal to direct beams between two paths; two birefringent filters 18, 21 that separately and selectively rotate the polarization of wavelengths to produce filtered signals; a birefringent walk-off element 20 which shifts one set of the polarized beams laterally to form a second path; and a beam angle deflector 19 that deflects all beams with a correction angle such that both optical paths are coupled into the dual collimators having an angle difference between the two beam propagations. The switch has a two-stage cascaded configuration.

To more specifically illustrate the method and system in accordance with the present invention, refer now to FIGS. 3 and 4 depicting one embodiment of a three-port, two-stage (1×2) optical wavelength switch. FIG. 3A depicts a top cross-section view of the optical switch. FIG. 3B depicts a side cross-section view of the optical switch. FIG. 4 further depicts the polarization states of the propagating beams as they exit each component. A first optical fiber 1 is inserted into a first collimator 10. Opposite the first optical fiber 1, a second optical fiber 2 is inserted into a second collimator 11 and a third optical fiber 3 is inserted into the same second collimator 11 adjacent to the second optical fiber 2, so that second optical fiber 2 and third optical fiber 3 are parallel. Beam propagations from the second optical fiber 2 and the third optical fiber 3 have an angle with respect to the y-axis caused by the focusing lens inside the second collimator 11.

Figure 4A:
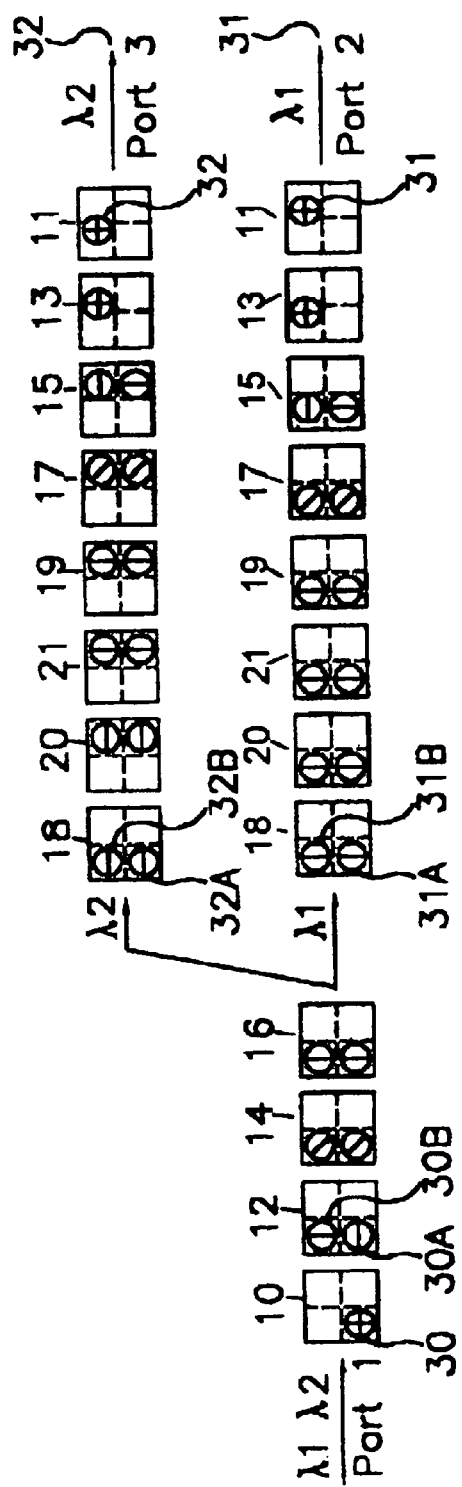
FIGS. 4A–4B depict cross-section schematic views of the polarization of light traversing the switch shown in FIGS. 3A–3B.
Figure 4B:
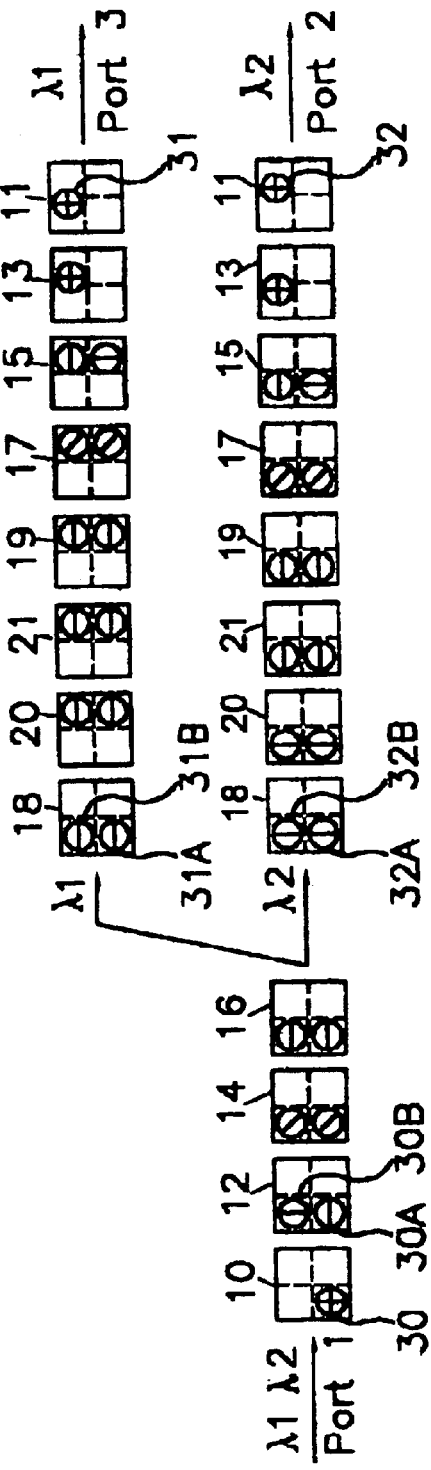

As shown in FIGS. 4A–4B, a beam 30 containing a full spectrum of data passes through a birefringent element 12 and is thereby divided into two beams 30A and 30B having orthogonal polarizations. The length of the birefringent element 12 is adjusted to obtain a spatial separation between beams 30A and 30B, which permits them to pass through independent optical elements, such as a halfwave plate 14. Beam 30A then enters a halfwave plate 14 which rotates its plane of polarization by 45° clockwise. Beam 30B enters another part of the halfwave plate 14 which rotates the plane of polarization by 45° counterclockwise. The halfwave plate 14 renders the polarization of beams 30A and 30B parallel to each other.

Considering a first switching state in which the light path of the spectral band that contains $\lambda_1$ is from port 1 to port 2 and the complementary spectral band that contains $\lambda_2$ is guided out through port 3, as indicated in FIG. 4A. In this light path state, both beams 30A and 30B enter the electrically controllable polarization rotator 16 which rotates the plane of polarization by 45° clockwise when a corresponding electrical control current is applied. The beams 30A and 30B then pass through a birefringent filter 18 which rotates the polarization of the $\lambda_2$ spectral band by 90° but passes the spectrum band containing $\lambda_1$ unaltered. The original beam 30 is now further decomposed into two sets of orthogonally polarized beams, namely, beams 31A and 31B for the $\lambda_1$ spectral band and beams 32A and 32B for the $\lambda_2$ spectral band, as shown in FIG. 4A. The two spectral bands are subsequently spatially separated by a birefringent walk-off element 20 which changes the propagation of beams 32A and 32B of the $\lambda_2$ spectral band with a spatial displacement along the x-axis.

AU beams 31A, 31B, 32A, and 32B then pass through the second stage birefringent filter 21 which rotates the polarization of beams 32A and 32B by 90° but passes beams 31A and 31B unaltered.

At this point, beams 31A, 31B, 32A, and 32B propagate parallel to the longitudinal y-axis but need to be bent at an angle θ with respect to the y-axis in order to be efficiently coupled into the dual fiber of the second collimator 11. A polarization-independent beam angle deflector 19 adjusts for this angle of propagation.

All beams 31A, 31B, 32A, and 32B then pass through a second electrically controllable polarization rotator 17, which rotates their polarization by 45° counterclockwise by applying an associated electrical current flow or field. All beams 31A, 31B, 32A, and 32B further enter a second halfwave plate 15, which selectively rotates the polarization of 32B and 31B by 45° counterclockwise and rotates 32A and 32A by 45° clockwise. A birefringent element 13 subsequently combines orthogonally polarized beams 31A and 31B to form a single beam 31 that is also focused onto port 3. Similarly, the birefringent element 13 combines beams 32A and 32B to form a single beam 32 that is focused onto port 2. An optical path from port 1 to port 2 for the $\lambda_1$ wavelength band and another optical path from port 1 to port 3 for the $\lambda_2$ wavelength band are established, when an appropriate control signal is applied to both Faraday-type electrically controllable polarization rotators 16, 17.

Next, considering a second wavelength switching state in which the light path for $\lambda_1$ spectral band is from port 1 to port 3 and for the complementary $\lambda_2$ spectral band is from port 1 to port 2, as indicated in FIG. 4B. In this light path state, both beams 30A and 30B enter the first Faraday-type electrically controllable polarization rotator 16 which rotates the plane of polarization by 45° counterclockwise with a corresponding current, rendering them in the horizontal direction, as seen in FIG. 4B. A birefringent filter 18 rotates the polarization of $\lambda_2$ spectral band by 90° but does not change the $\lambda_1$ spectrum band. The two spectral bands are subsequently spatially separated by a birefringent walk-off element 20 which alters the propagation of the $\lambda_1$ spectrum band with a spatial displacement. The beam 30 is thereby further divided into four beams, namely, beams 31A and 31B for the $\lambda_1$ spectrum band and beams 32A and 32B for the $\lambda_2$ spectrum band.

All beams 31A, 31B, 32A, and 32B then pass through a second stage birefringent filter 21 which rotates the polarization of beams 32A and 32B by 90° but passes beams 31A and 31B unaltered. A polarization-independent beam angle deflector 19 further bends the beams by an angle θ with respect to the y-axis to facilitate coupling into the dual-fibers of the second collimator 11.

AM beams 31A, 31B, 32A, and 32B then pass through the second electrically controllable polarization rotator 17, which rotates their polarization by 45° clockwise by applying an associated electrical current flow or field. The beams 31A, 31B, 32A, and 32B further enter a halfwave plate 15, which selectively rotates the polarization of 31B and 32B by 45° counterclockwise and rotates 31A and 32A by 45° clockwise. The birefringent element 13 subsequently combines orthogonally polarized beams 31A and 31B to form a single beam 31 that is also focused onto port 3. Similarly, the birefringent element 13 combines beams 32A and 32B to form a single beam 32 that is focused onto port 2. An optical path from port 1 to the port 2 for the $\lambda_2$ wavelength band and another optical path from port 1 to port 3 for the $\lambda_1$ wavelength band are established, when a control signal that is opposite to that of the first switching state is applied to both Faraday-type electrically controllable polarization rotators 16 and 17.

The above embodiment is a nonreciprocal device using electrically controllable polarization rotators 16, 17 comprising 45° magneto-optic Faraday rotators. Another preferred embodiment of FIG. 2 is a reciprocal wavelength switch. The reciprocal embodiment requires modification of the halfwave plates 14 and 15 and electrically controllable polarization rotators 16 and 17 having 90° rotation in the above nonreciprocal embodiment. Both magneto-optic Faraday rotators and electro-optic retarders can be used to construct the 90° electrically controllable polarization rotators 16 and 17 in the reciprocal wavelength switch embodiment. As described in a pending U.S. patent application, Ser. No. 09/971,285, an inventive reciprocal Faraday rotator that comprises a switchable first 45° garnet and a second permanent 45° polarization rotation garnet is applicable to be used as electrically controllable polarization rotators 16 and 17 in a bi-directional wavelength switch embodiment. The combined Faraday rotator rotates light polarization between 0° when the two garnet rotations cancel each other and 90° when the two garnet rotations are in the same direction. An electro-optic rotator configuration with side electrodes described in the referenced application is also applicable here to be used as electrically controllable polarization rotators 16 and 17 in the reciprocal wavelength switch embodiment.

In one embodiment, the Faraday-type electrically controllable polarization rotator 16 and 17 may be composed of yttrium-iron-garnet (YIG), or Bi-added thick film crystals with a low field of saturation, such as less than 200 Oe to reduce power consumption. One example of such materials is the bismuth-substituted rare earth iron garnet single crystal system represented by a chemical formula (GdRBi)$_3$(FeGaAl)$_5$O$_{12}$, where R denotes at least one element selected from the group consisting of yttrium (Y), ytterbium (Yb) and lutetium (Lu). The electromagnet is coupled to the Faraday rotator via copper coils. Iron alloys are often incorporated into the electro-magnet to improve the strength of the electrically induced magnetic field. Semi-hard magnetic metallic alloys can be used to achieve latching performance, although this is not essential for self-latching type garnets. Therefore, the inventive switch requires only a current pulse to switch the optical paths from one to another by reversing the polarity and achieving latching of the switching state even when the current is removed.

The general requirement for the electro-optic phase retarder used in the present invention is that, when a voltage is applied, a polarization rotation of 90° or ±45° is produced. Preferably, the material has a high electro-optic coefficient to reduce operating voltages to less than 500-volts, good thermal stability, and good transparency at the wavelength of interest, e.g., between 1200-nm and 1600-nm. These requirements are satisfied by a class of ferroelectric complex oxides which have a Curie temperature less than about 600° C., so that electro-optic coefficients are high in the operation temperature range. Example material systems include a solid solution of lead manganese niobate and lead tantalate (PMN-PT) and a solid solution of lead niobate zirconate and lead tantalate (PNZ-PT), lead manganese niobate (PMN), lanthanum modified PZT (PLZT). More members of this class of materials may be discovered in the future. It is particularly preferable to use single-crystal forms of the said class of ferroelectric materials as they provide good repeatability and temperature independent operation. Another family of electro-optic materials applicable to the present invention is new solid organic materials, such as polymers and organic crystals with large electro-optic effect. Solid organic electro-optic materials have an advantage of higher switching speed due to their relatively smaller dielectric constant.

The beam angle deflector 19 is typically a prism-based device. For example in some embodiments, the beam angle deflector 19 may consist of a tapered glass prism, whose angle is adjusted so that beams entering from ports 2 and 3 are rendered parallel to the y-axis as the beams exit the beam angle deflector 19. Other shapes and constructions of prisms can also perform the same function. In another embodiment, the beam angle deflector 19 can be constructed of two tapered birefringent plates usually formed from the same birefringent material to change angle of propagation. Two such examples are Wollaston-type and Rochon-type prisms.

The above device is a specific embodiment. However, one of ordinary skill in the art will readily recognize that this method and system will operate effectively for other components having similar properties, other configurations, and other relationships between components.

Reflection Mode Wavelength Selective Switch

An alternative embodiment of the present invention is a folded-path, three-port optical wavelength selective switch configuration, which uses fewer and shorter components than the straight-path embodiment.

Figure 5:
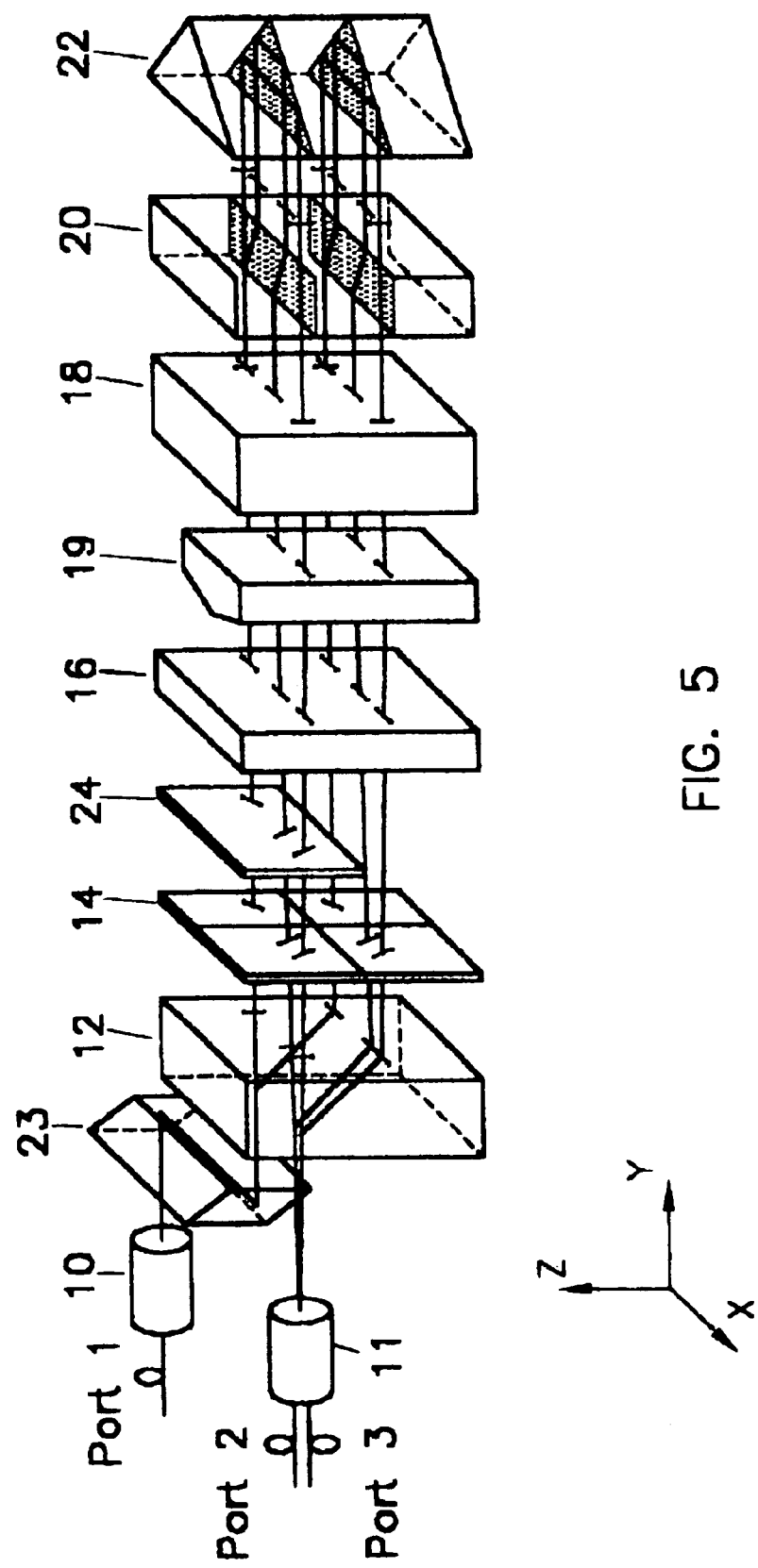
FIG. 5 depicts a perspective view of a reflection mode nonreciprocal two-stage optical wavelength switch according to a second embodiment of the present invention.

FIG. 5 depicts a specific nonreciprocal dual-stage reflection mode (1×2) wavelength selective switch configuration. By use of a right angle prism 22, the reflection mode switch essentially folds the straight switch in FIG. 2 from the center. Therefore, the reflection configuration advantageously eliminates the second stage birefringent filter 21, the electrically controllable polarization rotator 17, the halfwave plate 15, and the birefringent element 13 as well as shortens the lengths of birefringent filter 18 and birefringent walk-off element 20 by half due to the double pass inherent in this embodiment. A dove-type, prism-type position displacer 23 is incorporated here to provide larger separation between first collimator 10 and second collimator 11 for ease of manufacture. A plate 24 is also added to compensate for the travel distance (path-length) difference between the two polarization components caused by the birefringent element 12. In this embodiment, the switchable electrically controllable polarization rotator 16 is a 45° Faraday garnet rotator. The operation principle can be easily understood in the same way as the above embodiments by following the ray traces illustrated in FIG. 5.

Figure 6:
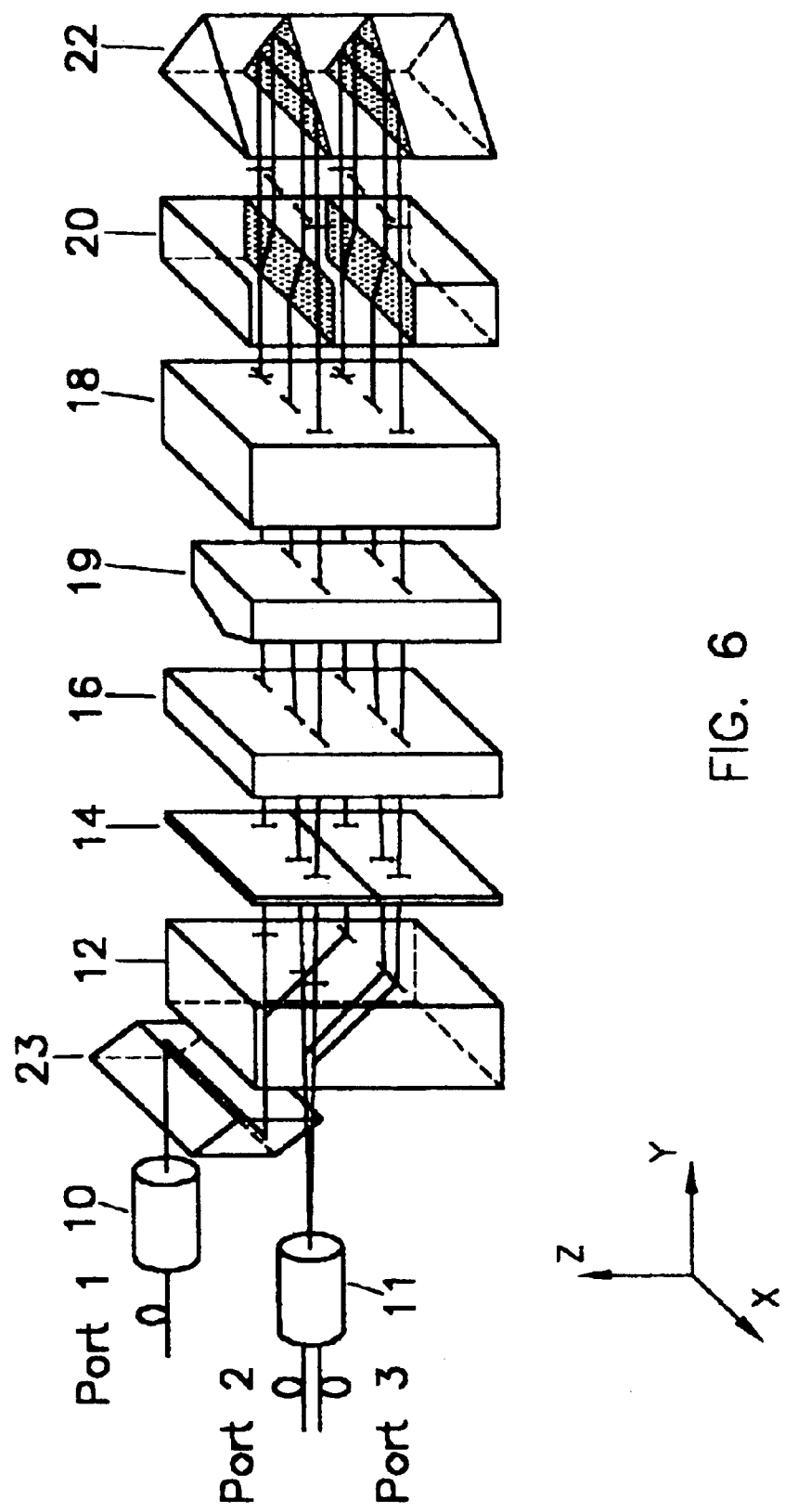
FIG. 6 depicts a perspective view of a reflection mode bi-directional two-stage optical wavelength switch according to a third embodiment of the present invention.

FIG. 6 depicts an examplary bi-directional single-stage reflection-mode wavelength switch. In this embodiment, the switchable electrically controllable polarization rotator 16 is a 90° rotator of Faraday garnets or an electro-optic crystal, similar to the straight-path version discussed above. In this configuration, the halfwave plate 14 is comprised of a halfwave 90° rotator bottom aperture and a polarization mode-dispersion compensation plate top aperture. This embodiment uses fewer components than the above embodiments.

Reflection Mode Wavelength Interleaver

Figure 7:
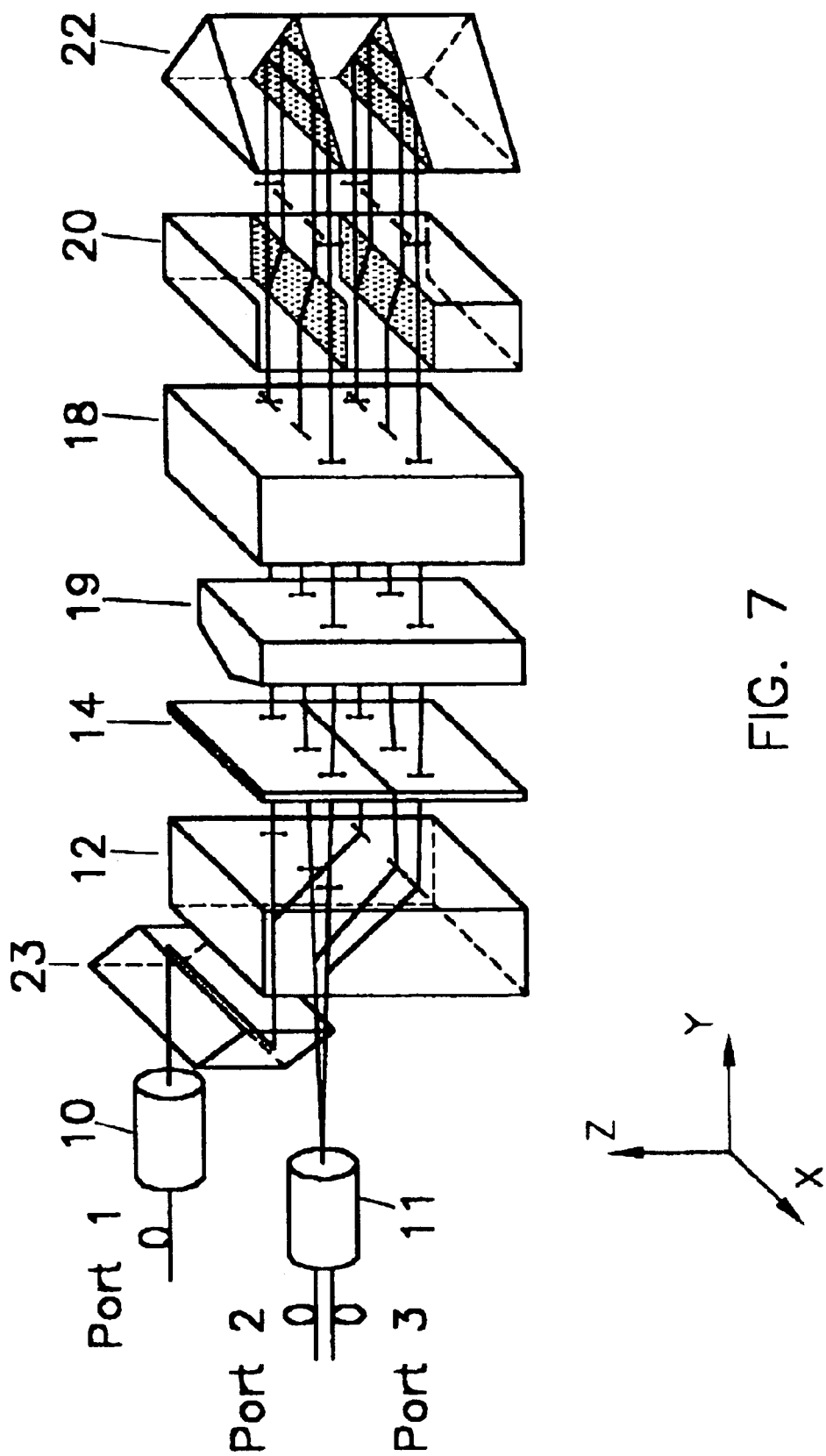
FIG. 7 depicts a perspective view of a reflection mode passive optical wavelength interleaver according to a fourth embodiment of the present invention.

The present invention can also be configured as a passive optical wavelength interleaver. FIG. 7 depicts a passive reflection interleaver embodiment. This inventive device uses fewer components and has increased alignment tolerance compared to the prior art. Therefore, it is easier to produce and cost is lower. The operation principle can be easily understood by following the ray traces illustrated in FIG. 7, as described in the above sections.

Reflection Mode Wavelength Independent Switch

Figure 8:
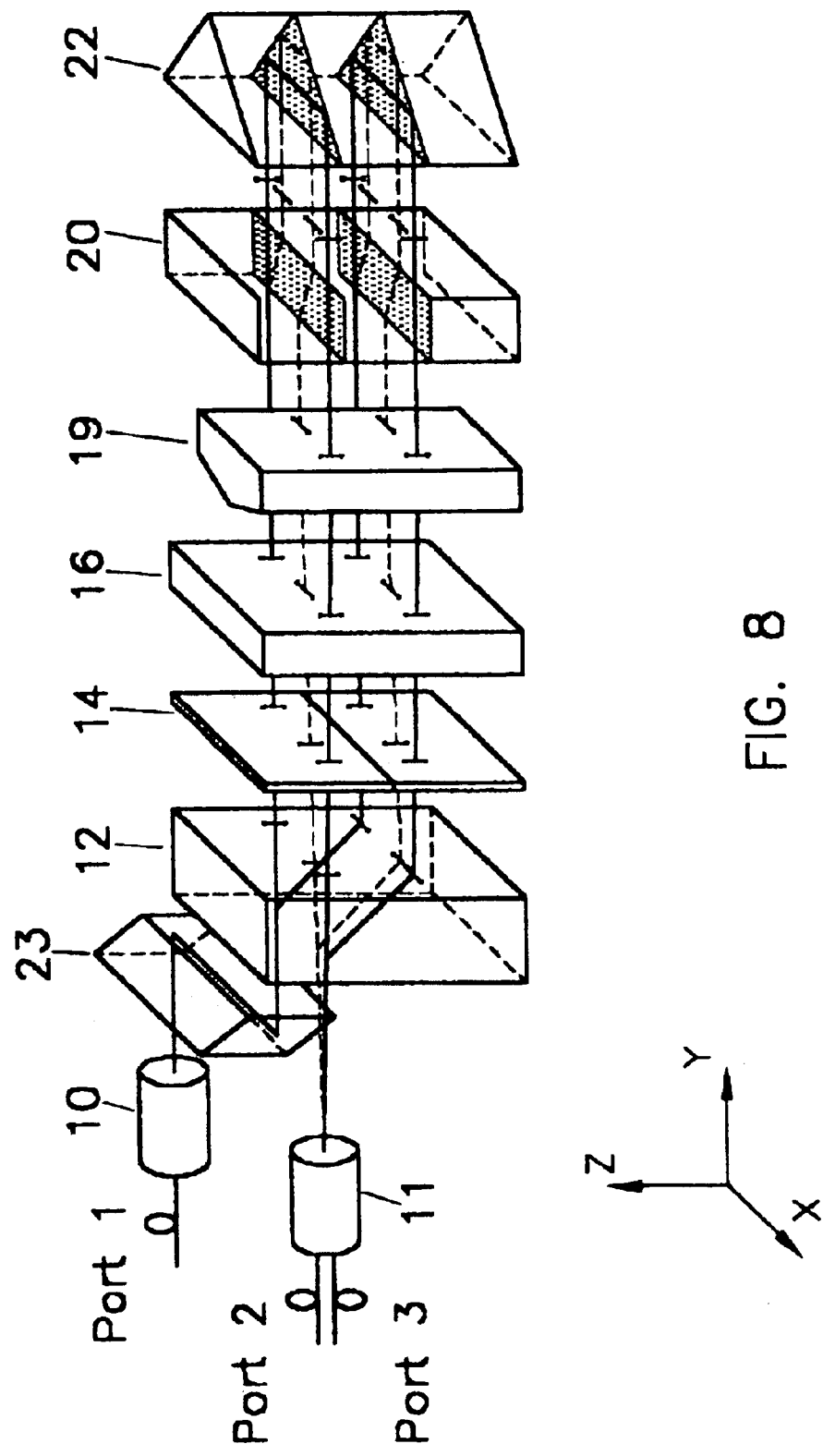
FIG. 8 depicts a perspective view of a reflection mode bi-directional two stage optical light path switch according to a fifth embodiment of the present invention.

The inventive device can be further configured to function as a wavelength-independent optical light path switch by simply removing the birefringent filter 18. FIG. 8 depicts a bidirectional 1×2 optical switch embodiment. A light beam is launched through the first collimator 10, spatially displaced by a dove-type, prism-type position displacer 23, so that alignments of first collimator 10 and second collimator 11 are easier made. The input beam is then decomposed into two orthogonally polarized components and spatially separated by the walk-off birefringent element 12. Their polarizations are consequently rotated by a halfwave plate 14 rendering them parallel in the z-direction. Consider a first switching state in which the light path is from port 1 to port 2, as indicated by the solid beam propagation line in FIG. 8. In this light path state, the electrically controllable polarization rotator 16 rotates the plane of polarization by 0°. The two beams then pass through a birefringent walk-off element 20 unaltered. A right-angle prism 22 reflects the beams back so as to have a displacement in x-direction. The reflected beams pass through a birefringent walk-off element 20 without change but are bent by a beam angle deflector 19 at an angle that matches the coupling angle of second collimator 11. Again, the reflected beams pass through the electrically controllable polarization rotator 16 without rotation. The halfwave plate 14 renders the parallel polarized reflected beams orthogonal and the walk-off birefringent element 12 combines the two beams to form a single beam that is focused onto port 2 mounted in the second collimator 11. An optical path from port 1 to port 2 is established, when no rotation is applied to the electrically controllable polarization rotator 16.

Next, consider a second switching state in which the light path is from port 1 to port 3, as shown in FIG. 8 by the dotted beam propagation line. Similarly, a first optical fiber 1 emits a light beam that becomes two vertically polarized beams after the halfwave plate 14. In this light path state, an electrically controllable polarization rotator 16 rotates the plane of polarization by 90°. The two horizontally polarized beams are then displaced a distance in the x-direction by passing birefringent walk-off element 20. The right-angle prism 22 reflects back the beam with an additional displacement in the x-direction. The reflected beams pass through the birefringent walk-off element 20 with another further displacement in the x-direction and are bent by the beam angle deflector 19 at an angle. Again, the reflected beams pass through the electrically controllable polarization rotator 16 with a second stage 90° rotation. The halfwave plate 14 renders the parallel, polarized beams orthogonal and the walk-off birefringent element 12 combines the two reflected beams to form a single beam focused onto port 3. An optical path from port 1 to port 3 is established, when a 90° rotation is applied to the electrically controllable polarization rotator 16.

The above descriptions of the 1×2 embodiments are very specific examples. It will be apparent to a person of average skill in the art that many variations of the switch are possible within the scope of the invention. Accordingly, the scope of the invention should be determined by the following claims and their legal equivalents.

What is claimed is:

1. An optical switch for selectively directing light with a certain set of spectra from a first fiber to a second fiber or to a third fiber and directing light with another set of spectra from said first fiber to said third fiber or to said second fiber, said second fiber and said third fiber being located adjacent to each other along a longitudinal axis, said optical switch comprising along said longitudinal axis in sequence from said first fiber to said second fiber and said third fibers:
  a) a first lens for guiding light from said first fiber to said second or said third fibers;
  b) a first block of birefringent material for separating and combining mutually orthogonal polarizations;
  c) a first compound half-wave plate for rendering mutually parallel polarizations orthogonal and mutually orthogonal polarizations parallel;
  d) a first compound polarization rotator whose polarization rotation can be electrically controlled;
  e) a first wavelength filter whose polarization rotation is wavelength dependent;
  f) a polarization-dependent beam path deflector;
  g) a second wavelength filter whose polarization rotation is wavelength dependent,
  h) a polarization-independent beam angle corrector;
  i) a second compound polarization rotator whose polarization rotation can be electrically controlled;
  j) a second compound half-wave plate for rendering mutually parallel polarizations orthogonal and mutually orthogonal polarizations parallel;
  k) a second block of birefringent material for separating and combining mutually orthogonal polarizations; and
  l) a second lens for guiding light to said second fiber or said third fiber from said first fiber, wherein said second fiber and said third fiber are placed adjacent to each other to form a dual collimator and exit said second lens at an angle θ with respect to said longitudinal axis.

2. The optical switch of claim 1 wherein said beam polarization-independent beam angle corrector is a glass prism that provides a beam receiving angle for said second fiber and said third fiber in said dual collimator.

3. The optical switch of claim 1 wherein said polarization-dependent beam path deflector comprises two tapered birefringent plates.

4. The optical switch of claim 1 wherein said first compound polarization rotator and said second compound polarization rotators comprise a 45° Faraday rotator, said 45° Faraday rotator is coupled to electromagnets.

5. The optical switch of claim 1 wherein said first compound polarization rotator and said second compound polarization rotators comprise a 90° Faraday rotator.

6. The optical switch of claim 5 further comprising a first switchable 45° Faraday rotator coupled to an electromagnet and a second permanent 45° Faraday rotator, said second permanent 45° Faraday rotator comprises either a latching garnet plate or a garnet plate saturated by a permanent magnet.

7. The optical switch of claim 4 or claim 6 wherein a magnetic field is formed by a coil and an electromagnet formed of a semi-hard magnetic material.

8. The optical switch of claim 1 wherein said first compound polarization rotator and sa second compound polarization rotators are selected from a class of garnet materials characterized by having a saturation field of less than 500 Oe.

9. The optical switch of claim 1 wherein said first compound polarization rotator and said second compound polarization rotators are an electro-optic retarder.

10. The optical switch of claim 1 wherein said first compound polarization rotator and said second compound polarization rotators are selected from a class of ferroelectric materials characterized by having a Curie temperature of less than about 600° C. and having a Vπ of less than about 600V.

11. The optical switch of claim 1 wherein said first compound polarization rotator and said second compound polarization rotators selected from a class of solid organic materials characterized by having a Vπ of less than about 600V.

12. The optical switch of claim 1 wherein said first block of birefringent material, said second blocks of birefringent material, said polarization-dependent beam path deflector, said first wavelength filter, and said second wavelength filters are a material selected from the group consisting of rutile, calcite, and yttrium orthovanadate.

13. A reflection mode optical wavelength switch for selectively directing light with a certain set of spectra from a first fiber to a second fiber or to a third fiber and directing light with another set of spectra from said first fiber to said third fiber or to said second fiber on same side of said first fiber, said second fiber and said third fiber being located adjacent to each other along a longitudinal axis, said reflection mode optical wavelength switch comprising along said longitudinal is in sequence:
  a) a first lens for guiding light from said first fiber to said second or said third fiber;
  b) a second lens for guiding light to said second fiber or said third fiber from said first fiber, said second fiber and said third fiber placed adjacent to each other to form a dual collimator and exit said second lens at an angle with respect to said longitudinal axis;
  c) a block of birefringent material for separating and combining mutually orthogonal polarizations;
  d) a compound half-wave plate for rendering mutually parallel polarizations orthogonal and mutually orthogonal polarizations parallel;
  e) a compound polarization rotator whose polarizations rotation can be electrically controlled, said compound polarization rotator being composed of a single-piece crystal of regular shape so as to allow a plurality of beams to pass through said compound polarization rotator without bypass;
  f) a polarization-independent beam angle corrector;
  g) a wavelength filter;
  h) a polarization-dependent beam path deflector; and
  i) a prism reflector.

14. The reflection mode optical wavelength switch of claim 13 wherein said prism reflector is a total reflection right angle prism.

15. The reflection mode optical wavelength switch of claim 13 further comprising a beam displacement prism located in front of said first lens for increasing the separation between said first lens and said second lens.

16. The reflection mode optical wavelength switch of claim 13 wherein said compound polarization rotator is a 45° rotator.

17. The reflection mode optical wavelength switch of claim 13 wherein said compound polarization rotator is a 90° rotator.

18. The reflection mode optical wavelength switch of claim 13 wherein said compound half-wave plate further comprising a compensation plate configured to compensate for optical difference between an ordinary ray and an extraordinary ray in the said block of birefringent material.

19. A reflection mode optical wavelength interleaver for directing light with a certain set of spectra from a first fiber to a second fiber or to a third fiber and directing light with another set of spectra from said first fiber to said third fiber or to said second fiber on the same side of said first fiber, said second fiber and said third fiber being located adjacent to each other along a longitudinal axis, said reflection mode optical wavelength interleaver comprising along said longitudinal axis in sequence:
- a) a first lens for guiding light from said first fiber to said second or said third fibers;
- b) a second lens for guiding light to said second fiber or said third fiber from said first fiber, said second fiber and said third fiber placed adjacent to each other to form a dual collimator and exit said second lens at an angle with respect to said longitudinal axis,
- c) a block of birefringent material for separating and combining mutually orthogonal polarizations;
- d) a compound half-wave plate for rendering mutually parallel polarizations orthogonal and mutually orthogonal polarizations parallel;
- e) a polarization-independent beam angle corrector;
- f) a wavelength filter;
- g) a polarization-dependent beam path deflector; and
- h) a prism reflector.

20. A reflection optical switch for directing light from a first fiber to a second fiber or to a third fiber on same side of said first fiber, said second fiber and said third fiber being located adjacent to each other along a longitudinal axis, said reflection optical switch comprising along said longitudinal axis in sequence from said first fiber to said second fiber and said third fibers:
- a) a first lens for guiding light from said first fiber to said second fiber or said third fibers;
- b) a block of birefringent material for separating and combining mutually orthogonal polarizations;
- c) a compound half-wave plate for rendering mutually parallel polarizations orthogonal and mutually orthogonal polarizations parallel;
- d) a compound polarization rotator whose polarizations rotation can be electrically controlled, said compound polarization rotator being composed of a single-piece crystal of regular shape so as to allow a plurality of beams to pass through said compound polarization rotator without bypass;
- e) a polarization-independent beam angle corrector;
- f) a polarization-dependent beam path deflector; and
- g) a prism reflector.

21. The reflection optical switch of claim 20 wherein said compound polarization rotator is a 45° rotator.

22. The reflection optical switch of claim 20 wherein said compound polarization rotator is a 90° rotator.

* * * * *